United States Patent
Dalmiya et al.

(10) Patent No.: US 11,323,983 B2
(45) Date of Patent: May 3, 2022

(54) EFFICIENT USAGE OF RESOURCES IN AN UPLINK SPLIT BEARER CONFIGURATION

(71) Applicant: QUALCOMM Incorporated, San Diego, CA (US)

(72) Inventors: Vishal Dalmiya, San Diego, CA (US); Vaishakh Rao, San Diego, CA (US); Leena Zacharias, Hyderabad (IN); Krishna Chaitanya Bellam, Hyderabad (IN); Sathish Kumar Nallamanti, San Jose, CA (US); Shailesh Maheshwari, San Diego, CA (US); Kailu Gao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/031,230

(22) Filed: Sep. 24, 2020

(65) Prior Publication Data
US 2021/0099977 A1   Apr. 1, 2021

(30) Foreign Application Priority Data

Oct. 1, 2019   (IN) .............................. 201941039707

(51) Int. Cl.
*H04W 72/04*   (2009.01)
*H04W 76/19*   (2018.01)
*H04W 76/16*   (2018.01)

(52) U.S. Cl.
CPC ........... *H04W 72/04* (2013.01); *H04W 76/16* (2018.02); *H04W 76/19* (2018.02)

(58) Field of Classification Search
None
See application file for complete search history.

(56) References Cited

U.S. PATENT DOCUMENTS

| | | | |
|---|---|---|---|
| 2018/0279173 A1 | 9/2018 | Loehr et al. | |
| 2019/0069308 A1* | 2/2019 | Lee | ........................ H04W 72/10 |
| 2019/0215719 A1 | 7/2019 | Wei et al. | |
| 2019/0254042 A1* | 8/2019 | Cirik | ................... H04W 74/004 |
| 2019/0254100 A1* | 8/2019 | Yu | ......................... H04L 1/1607 |
| 2021/0100061 A1* | 4/2021 | Park | .................. H04W 28/0268 |

FOREIGN PATENT DOCUMENTS

WO    2018212535 A1    11/2018

OTHER PUBLICATIONS

International Search Report and Written Opinion—PCT/US2020/052783—ISA/EPO—dated Dec. 8, 2020.

\* cited by examiner

*Primary Examiner* — Mohammad S Adhami
(74) *Attorney, Agent, or Firm* — Patterson & Sheridan, LLP

(57) ABSTRACT

Certain aspects of the present disclosure provide techniques for wireless communications by a user equipment (UE) capable of establishing a split bearer involving at least primary and secondary radio link control (RLC) entities. The techniques generally include deciding, based on one or more conditions, whether to submit a Packet Data Convergence Protocol (PDCP) protocol data unit (PDU) to the primary RLC entity or the secondary RLC entity according to one or more rules and submitting the PDCP PDU to at least one of the primary or secondary RLC entities in accordance with the decision.

30 Claims, 4 Drawing Sheets

EFFICIENT USAGE OF RESOURCES IN AN UPLINK SPLIT BEARER CONFIGURATION

PRIORITY CLAIM(S)

This application claims benefit of the priority to Indian Provisional Application No. 201941039707, filed on Oct. 1, 2019, which is expressly incorporated by reference in its entirety as if fully set forth below and for all applicable purposes.

FIELD OF THE DISCLOSURE

Aspects of the present disclosure relate to wireless communications, and more particularly, to techniques for routing data by a user equipment (UE) capable of establishing a split bearer involving at least primary and secondary radio link control (RLC) entities.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipment (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include efficient use of resources for uplink (UL) transmissions by a UE configured with a split bearer.

Certain aspects of the present disclosure provide a method for wireless communications by a user equipment (UE) capable of establishing a split bearer involving at least primary and secondary radio link control (RLC) entities. The method generally includes establishing a split bearer involving at least primary and secondary RLC entities, deciding, based on one or more conditions, whether to submit a Packet Data Convergence Protocol (PDCP) protocol data unit (PDU) to the primary RLC entity or the secondary RLC entity according to one or more rules, and submitting the PDCP PDU to at least one of the primary or secondary RLC entities in accordance with the decision.

Certain aspects of the present disclosure are directed to an apparatus for wireless communication by a UE. The apparatus generally includes a memory and at least one processor coupled to the memory, the memory and the at least one processor being configured to establish a split bearer involving at least primary and secondary RLC entities, decide, based on one or more conditions, whether to submit a PDCP PDU to the primary RLC entity or the secondary RLC entity according to one or more rules, and submit the PDCP PDU to at least one of the primary or secondary RLC entities in accordance with the decision Certain aspects of the present disclosure are directed to an apparatus for wireless communication by a UE. The apparatus generally includes means for establishing a split bearer involving at least primary and secondary RLC entities, means for deciding, based on one or more conditions, whether to submit a PDCP PDU to the primary RLC entity or the secondary RLC entity according to one or more rules, and means for submitting the PDCP PDU to at least one of the primary or secondary RLC entities in accordance with the decision.

Certain aspects of the present disclosure are directed to an computer readable medium having instructions stored thereon for establish a split bearer involving at least primary and secondary RLC entities, decide, based on one or more conditions, whether to submit a PDCP PDU to the primary RLC entity or the secondary RLC entity according to one or more rules, and submit the PDCP PDU to at least one of the primary or secondary RLC entities in accordance with the decision.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
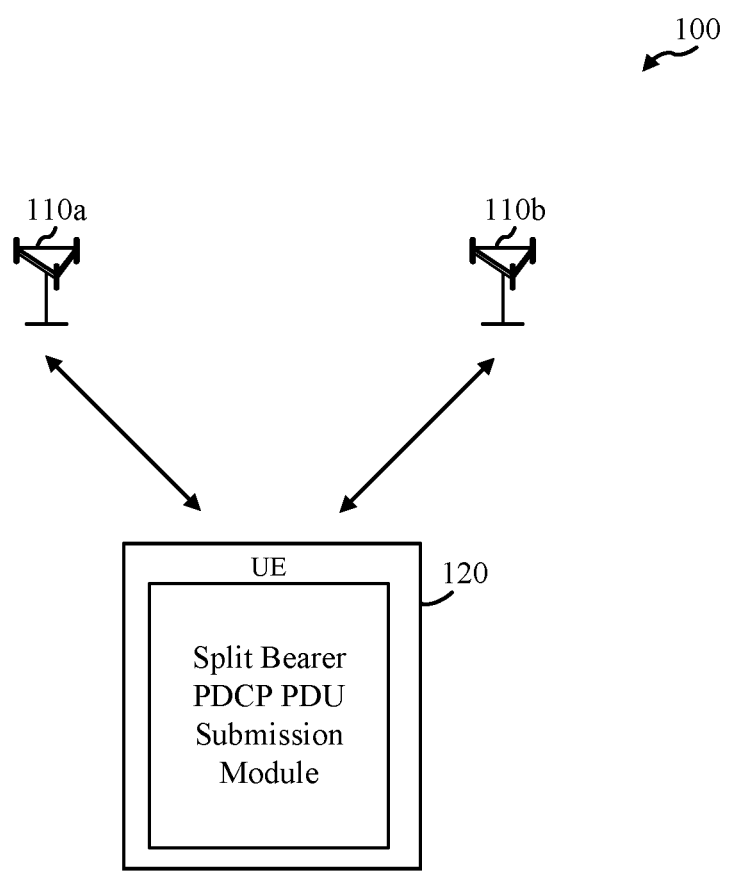
FIG. 1 is a block diagram conceptually illustrating an example telecommunications system, in accordance with certain aspects of the present disclosure.

Aspects of the present disclosure provide apparatus, methods, processing systems, and computer readable mediums for routing data by a UE capable of establishing a split bearer involving at least primary and secondary radio link control (RLC) entities.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communication Network

FIG. 1 illustrates an example wireless communication network 100 in which aspects of the present disclosure may be performed. The wireless communication network 100 may be an NR system (e.g., a 5G NR network). Certain aspects of the present disclosure relate to processing multi-connectivity transmissions.

For example, as shown in FIG. 1, the UE 120 may be communicating with multiple bases stations 110a and 110b after establishing a split bearer in a multi-connectivity mode, such as an E-UTRA to NR Dual Connectivity (ENDC) mode. As illustrated, the UE 120 may have a module for deciding how to submit PDCP PDUs via the split bearer. For example, the module may be configured to perform (or may configure the UE to perform) operations 500 of FIG. 5 described below.

As illustrated in FIG. 1, the wireless communication network 100 may include a number of base stations (BSs) 110a and 110b and other network entities. ABS may be a station that communicates with user equipment (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 2:
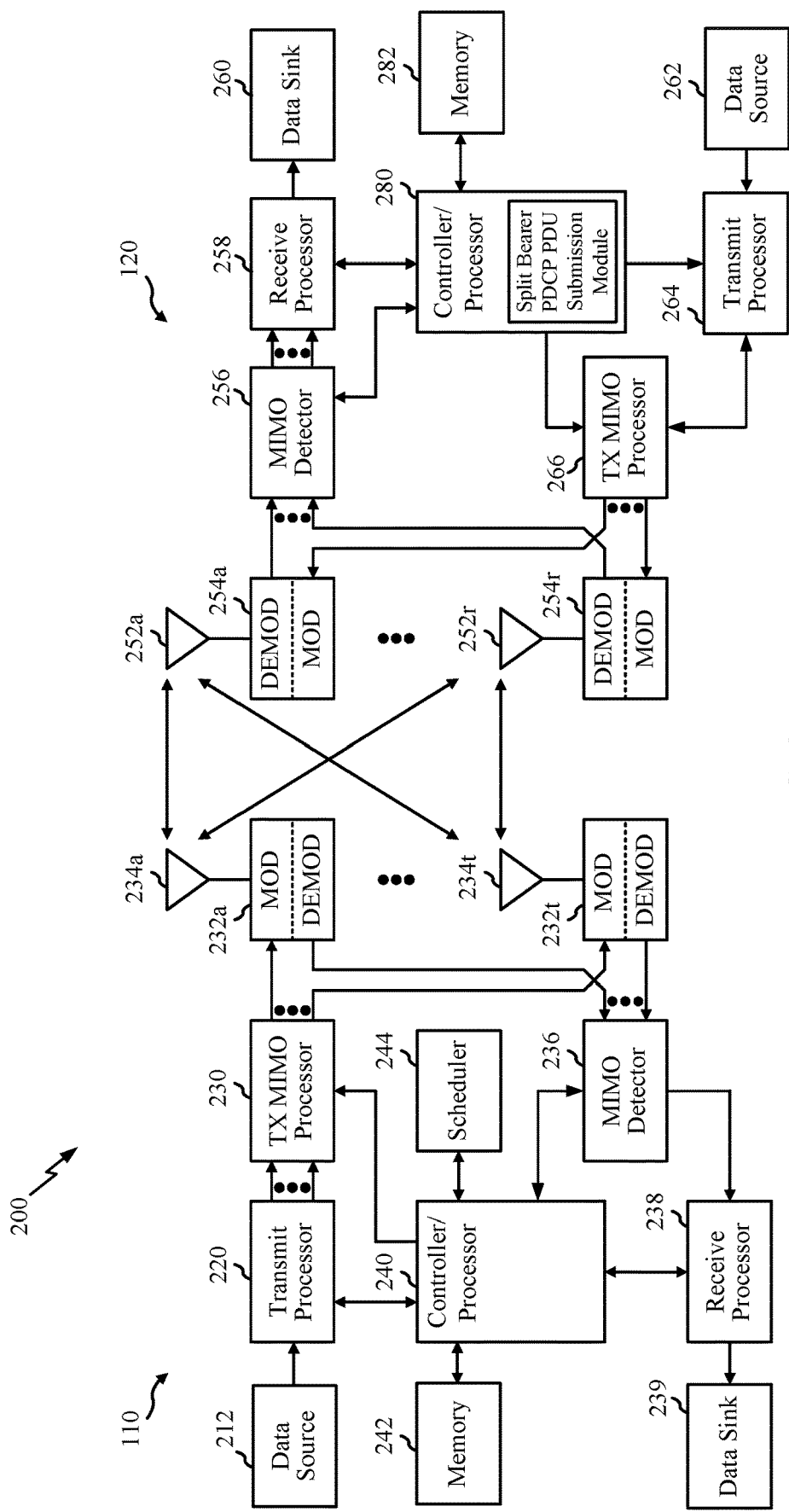
FIG. 2 is a block diagram conceptually illustrating a design of an example base station and user equipment, in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein for dynamically controlling uplink transmit power in multi-connectivity mode. For example, as shown in FIG. 2, the controller/processor 280 of the UE 120 may implement the split bearer PDCP PDU submission module. As noted above, this module may be configured to perform (or may configure the UE 120 to perform) operations 500 of FIG. 5.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Example Procedure for Efficient Use of RLC/MAC Resources in UL Split Bearer Configuration Aspects of the present disclosure relate to wireless communications, and more particularly, to techniques designed to make efficient use of resources when sending uplink (UL) data by a UE via a split bearer configuration. The techniques may be used in systems, for example, that deploy ENDC.

Figure 3:
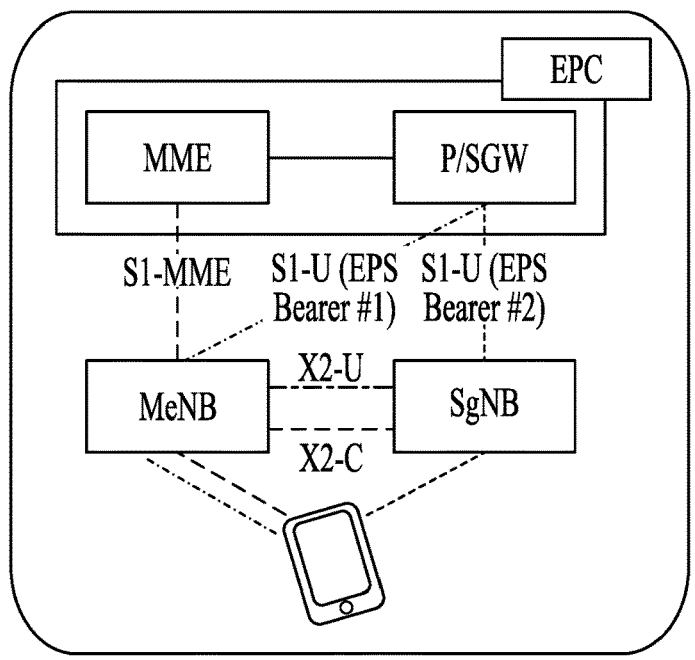
FIG. 3 illustrates an example option for dual connectivity, in accordance with certain aspects of the present disclosure.

In an ENDC call, the network (NW) can configure the UE with a mechanism referred to as an UL Split Bearer. As illustrated in FIG. 3, in an UL Split Bearer, two RLC entities (e.g., NR and LTE) can simultaneously build transport blocks (TBs) for simultaneous (or nearly simultaneous) transmission to a primary entity (e.g., a master eNB or MeNB) and a secondary entity (e.g., a slave or secondary gNB or SgNB) when a grant is available and certain conditions are met.

Figure 4:
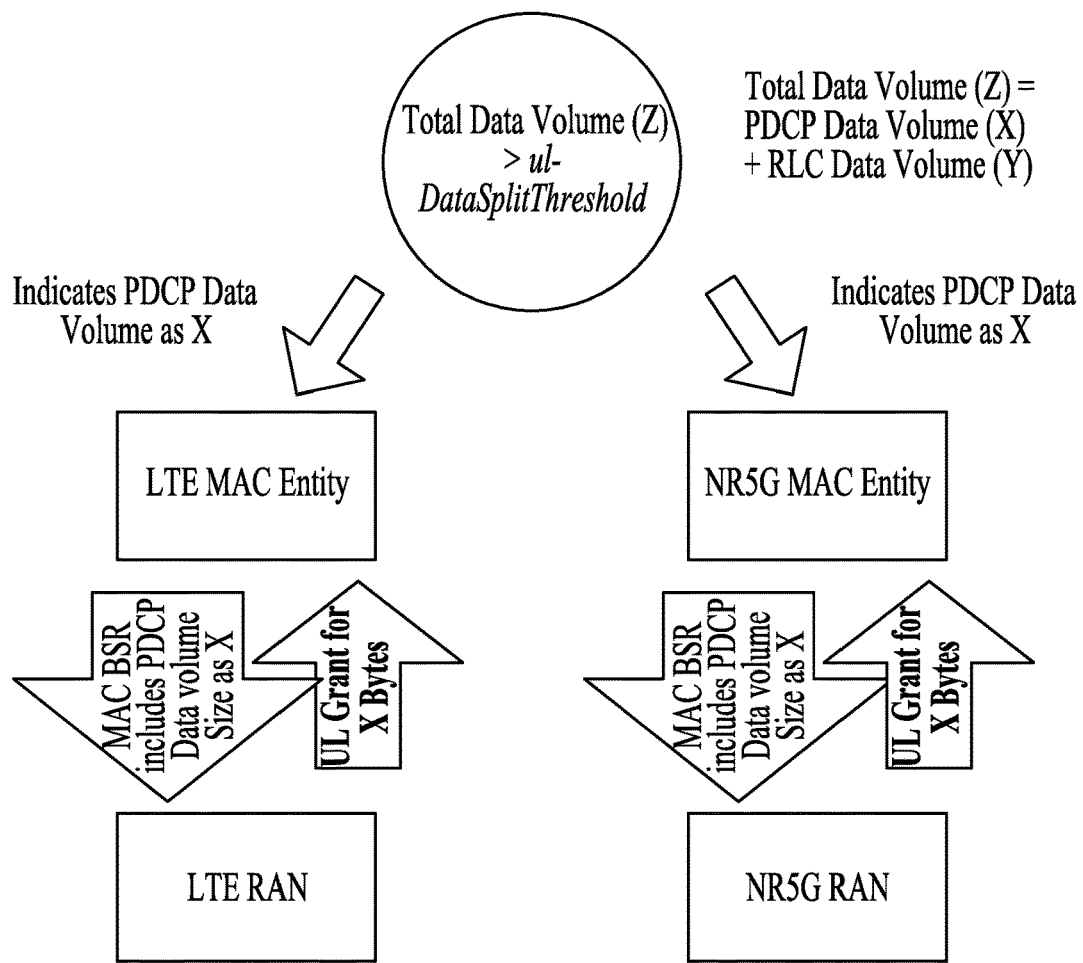
FIG. 4 illustrates example steps for routing data by a UE that has established dual connectivity, in accordance with certain aspects of the present disclosure.

As illustrated in FIG. 4, to support this feature, the network (NW) typically configures the UE with a 'Primary RLC Entity' and a 'Secondary RLC Entity'. The NW also configures the UE with a parameter 'ul-DataSplitThreshold', which generally refers to a value given in bytes which determines a threshold amount of data volume that the 'Secondary RLC Entity' checks against before building PDUs in TB.

As demonstrated in the example of FIG. 4, a general rule implemented by the UE when submitting a PDCP PDU to the lower layer (assuming the two associated RLC entities belong to the different Cell Groups), may be to submit the PDCP PDU to either the primary or second RLC entities if the total amount of PDCP data volume and RLC data volume pending for an initial transmission in the two associated RLC entities is greater than or equal to ul-DataSplitThreshold. Otherwise, the UE may be restricted to submit the PDCP PDU to the primary RLC entity alone. The general rule described above may also apply to any dual connectivity (DC) case (e.g., new radio (NR) DC where both primary and secondary entities are NR).

Unfortunately, this rule may lead to a less than optimal result in certain scenarios. For example, in some cases, the rule may lead to a waste of resources due to unnecessary padding (e.g., the addition of bits to achieve a certain data size) at the secondary RLC entity secondary TB. This is because the phrase in the rule above "when submitting a PDCP PDU to lower layer" may imply that the check against the 'ul-DataSplitThreshold' needs to be done at the PDCP PDU level by the Secondary RLC entity. As a result, in the case when the grant value is such that the grant value is more than the amount of data the Secondary RLC Entity can build based on the 'ul-DataSplitthreshold' condition, then it will unnecessarily pad the remaining TB.

This result may be illustrated by the following example with the following assumptions:

UE receives an UL grant for 1000 bytes;
ul-DataSplitThreshold is 2000 bytes;
The outstanding PDCP Data Volume is 2200 bytes; and/or
Each PDCP PDU is 100 bytes.

Given these parameters, and adhering to the rule above, the Secondary RLC entity can:

Build a first PDU (PDU1) since 2200>=2000, which leaves a remaining Grant=900;
Build a second PDU (PDU2) since 2100>=2000, which leaves a remaining Grant=800; and/or
Build a third PDU (PDU3) since 2000>=2000, which leaves a remaining Grant=700.

Unfortunately, if the UE adheres to the rule above, the Secondary RLC entity cannot build PDU4 onwards (since 1900 is not >=2000). Hence, the remaining grant of 700 will lead to unnecessary padding and a thus wastage of resources on the Secondary RLC entity.

Another example of potential wastage of resources on RLC Entity in the event of high block error rate (BLER) on one of the RLC entities. This is due to the fact that the rule above that the secondary RLC Entity can build PDUs only when the above ul-DataSplitThreshold conditions are met, yet does not consider (e.g., is "agnostic to") Physical Layer conditions. In certain cell-edge scenarios, or other adverse channel condition scenarios, there may be a significant amount of retransmissions in the Physical Layer (e.g., HARQ RETX and failure), which can lead to increased RLC level BLER. In such cases, the PDUs built on the corresponding RLC Entity with relatively high BLER could have an increased risk of not being received by the NW.

As will be described below, given that the UE has two RLC Entities simultaneously active, the UE could monitor the channel conditions of each, and utilize the RLC Entity with the better channel conditions (e.g., the "healthier" RLC entity) to more efficiently utilize resources by re-transmitting un-acknowledged PDCP PDUs on that (healthier) RLC entity.

Aspects of the present disclosure provide techniques for addressing these issues. For example, allowing a UE to relax certain rules and/or consider channel conditions when deciding whether (or not) to submit a PDCP PDU to a given RLC entity, as proposed herein, may help reduce resource wastage.

Figure 5:
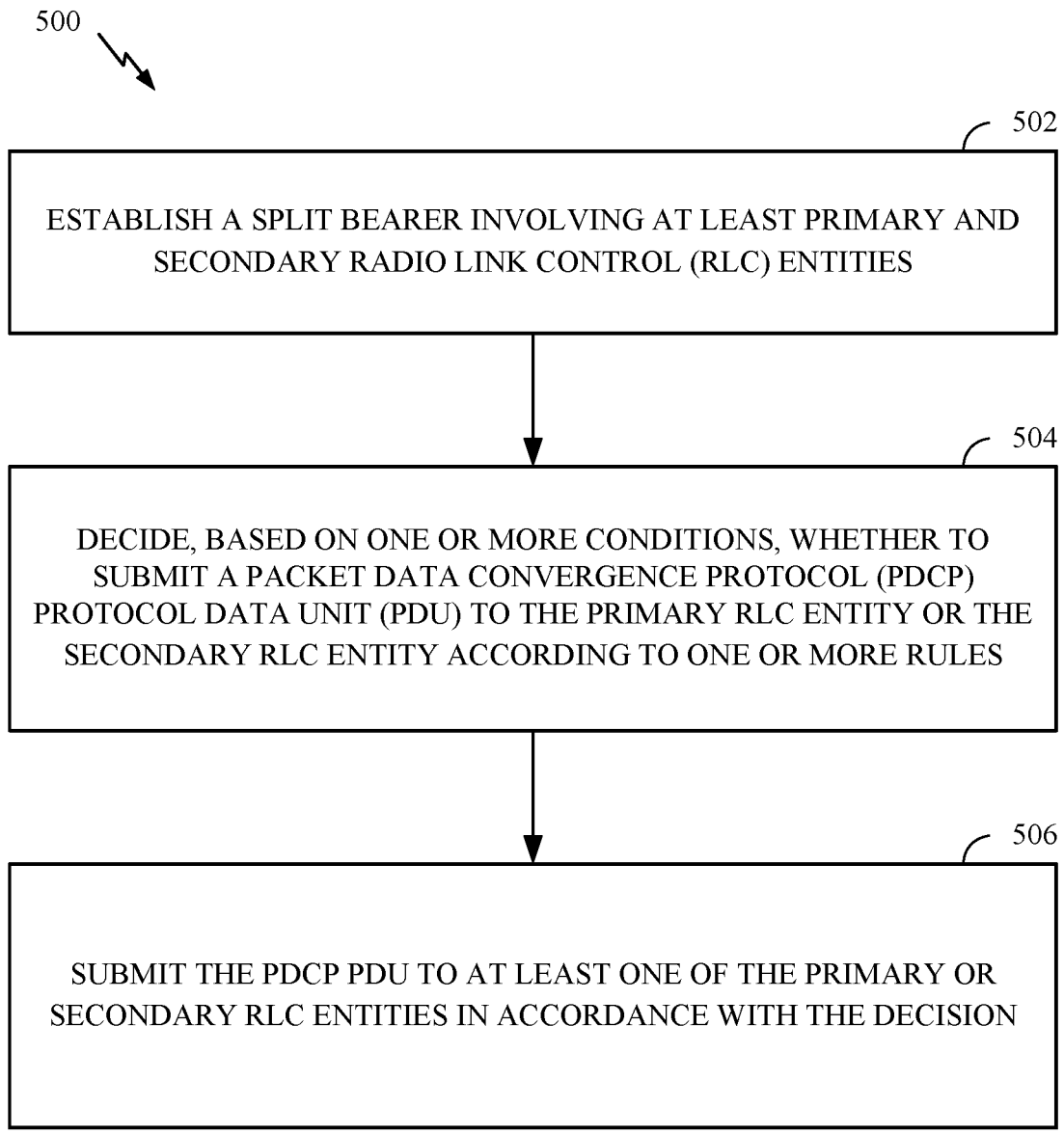
FIG. 5 illustrates example operations for wireless communications by a UE, in accordance with aspects of the present disclosure.

FIG. 5 is a flow diagram illustrating example operations 500 for wireless communication, in accordance with certain aspects of the present disclosure. The operations 500 may be performed, for example, by a UE capable of supporting a split bearer (e.g., such as a UE 120 in the wireless communication network 100).

Operations 500 begin, at 502, by establishing a split bearer involving at least primary and secondary RLC entities. At 504, the UE decides, based on one or more conditions, whether to submit a PDCP PDU to the primary RLC entity or the secondary RLC entity according to one or more rules. At 506, the UE submits the PDCP PDU to at least one of the primary or secondary RLC entities in accordance with the decision.

One example to address the resource wastage is to relax the ul-DataSplitthreshold condition on the Secondary RLC Entity to avoid excessive padding when the threshold transition (e.g., of the total data payload below the threshold) occurs in the middle of processing the TB.

For example, in the example given above, 700 bytes of grant was wasted in unnecessarily padding the TB. In contrast, the Secondary RLC Entity could be allowed to build more PDUs until the Secondary RLC entity exhausts the grant completely. This approach may help ensure that the UL resources for that given TB are not wasted. Such a wastage can be mitigated in this manner, for example, in cases when the UL grant is relatively large and, hence, the throughput could drop.

Another approach to address resource wastage is to configure the Secondary RLC Entity to build complete RLC PDUs if a grant is received on the Secondary RLC when the pending data payload is already below the ul-DataSplit-threshold threshold. Ideally, the grant may not be scheduled by the NW on the Secondary RLC Entity when the PDCP Data Volume is below ul-DataSplitthreshold (e.g., as known based on buffer status reports BSRs). But, if the NW does send such a grant, instead of the Secondary RLC Entity padding the TB and wasting resources, the Secondary RLC entity could build complete PDUs and utilize the bandwidth more appropriately. In such cases, the PDUs that are built can be at the level of complete RLC PDUs and avoid segmentation, because segmentation would typically necessitate yet another grant to completely transmit the PDCP PDU (e.g., for any remaining segment).

As an alternative, if a grant is received on Secondary RLC Entity when below ul-DataSplitthreshold, the Secondary RLC Entity may be configured to build RLC PDUs along with segments, if necessary. Again, the grant should not be scheduled by NW on the Secondary RLC Entity when PDCP Data Volume is below ul-DataSplitthreshold. However, if the NW does send such a grant, instead of the Secondary RLC Entity padding the TB and wasting resources, the Secondary RLC Entity may be configured to build PDUs and utilize the bandwidth more appropriately. The PDUs that are built can be built according to the granularity of RLC segment PDUs. As noted above, the remaining RLC segment may need to be transmitted, for which the Secondary RLC Entity can trigger a BSR, which effectively requests the NW to schedule a grant for just the segment. In the following grant, if the PDCP Data Volume is still below ul-DataSplit-threshold, then the Secondary RLC Entity may decide to build only the remaining Segment (and pad the rest).

In some cases, if a grant is received on Secondary RLC Entity when below ul-DataSplitthreshold, the Secondary RLC entity may build RLC PDUs along with Segments if necessary and send the same PDCP PDU on the Primary RLC Entity. In other words, if the NW sends such a grant, instead of the Secondary RLC Entity padding the TB and wasting resources, the Secondary RLC Entity could build PDUs and utilize the bandwidth more appropriately. The PDUs that are built can be built according to the granularity of RLC Segment PDUs, but any remaining RLC Segment may still need to be transmitted. Instead of forcing a BSR on the Secondary RLC Entity, however, the UE can transmit the same PDCP PDU on the Primary RLC Entity as well to ensure the receiver receives PDCP PDUs in order without any PDCP holes.

In some cases, if an RLC Entity detects a 'high' BLER (e.g., above a threshold value), that may indicate the channel conditions on that particular Entity are poor and/or deteriorating. Hence, in such cases, there may be little value in building new PDUs on that Entity. In order to mitigate the BLER this entity would likely experience if the entity continued transmitting, this RLC Entity could stop requesting for more data and may report zero BSR, for example, even if ul-DataSplitthreshold conditions are met. The RLC Entity may continue to report zero BSR (or refrain from sending a non-zero BSR), until this RLC entity has deemed itself to have recovered from the adverse channel conditions, at which point it can again report non-zero BSR.

In some cases a UE may retransmit (RETX) equivalent PDCP PDUs that have not received RLC ACK (on one RLC entity) for a long time on the other RLC Entity. Due to the BLER on one RLC Entity, the PDCP PDUs may not have successfully reached the NW. In such cases, the PDCP window on the receiver side may be held up for a long time with PDCP holes. In order to mitigate such conditions, the RLC Entity with better channel conditions could re-transmit the (unacknowledged) PDCP PDUs in order to increase the chances of delivering the PDU to the NW.

In some cases, a UE may (re)transmit PDUs on a master cell group (MCG) when a secondary cell group (SCG) is failing or has failed (e.g., due to radio link failure RLF). In this case, the primary RLC entity may be in the MCG, and the secondary RLC entity may be in the SCG. In general, SCG failure indicates RLF on the SCG, and, accordingly, downlink and UL communications on SCG may be suspended until a new configuration comes from the network (e.g., a PDCP re-establishment/recovery). For an UL split bearer, such suspension can result in:
 (1) New PDUs cannot be sent out on the MCG if primaryPath and ul-DataSplitThreshold are configured such that UE must send data on the SCG (e.g., primaryPath=SCG, ul-DataSplitThreshold=high value);
 (2) PDUs transmitted previously on the SCG, but not acknowledged, are stuck on an SCG leg, resulting in PDCP holes at the receiver side; and/or
 (3) RLC segment(s) may be left in the SCG RLC resulting in PDCP holes at the receiver side.

Thus, to resolve the above-mentioned issues according to certain aspects of the present disclosure, the UL split bearer may be configured to send new data only on the MCG irrespective of the primaryPath and ul-DataSplitThreshold configuration. Also, any unacknowledged data and/or remaining RLC segments on the SCG RLC can simply be retransmitted (e.g., as a PDCP retransmission) on the MCG RLC instead. In this case, such retransmission can occur before PDCP recovery and/or re-establishment. Another possible use case is if one link is tuned away for MSIM, and the other link is used for such PDCP retransmission The PDCP recovery/re-establishment may happen at a later stage when, for example, the UE transmits SCG Failure Information to the network, and/or when the split bearer configuration is also modified. This implementation leverages use of the MCG path when the SCG path is not available, even though the network configuration may indicate otherwise. Further, the UL data transmission can be retained and PDCP holes can be recovered faster in case of SCG failure.

As noted above, allowing a UE to relax certain rules and/or consider channel conditions when deciding whether or not to submit a PDCP PDU to a given RLC entity, as proposed herein, may help reduce resource wastage. For example, the techniques presented herein may avoid any padding and wastage of resources and improve overall PDCP throughput by efficiently using the NW allocated resources. By monitoring channel conditions, a UE may help reduce RLC retransmissions on a given RLC entity (experiencing poor or deteriorating channel conditions), which may help improve reliability of PDCP PDUs by increasing the chances of successful delivery and potentially reducing delays to delivery time of PDCP PDUs in certain adverse conditions.

EXAMPLE EMBODIMENTS

Embodiment 1: A method for wireless communication by a user equipment (UE), comprising establishing a split bearer involving at least primary and secondary radio link control (RLC) entities; deciding, based on one or more conditions, whether to submit a Packet Data Convergence Protocol (PDCP) protocol data unit (PDU) to the primary RLC entity or the secondary RLC entity according to one or more rules; and submitting the PDCP PDU to at least one of the primary or secondary RLC entities in accordance with the decision.

Embodiment 2: The method of Embodiment 1, wherein the one or more conditions are designed to avoid wastage of network provided resources.

Embodiment 3: The method of Embodiment 1 or 2, wherein the UE is operating in a dual connectivity (DC) mode where the primary RLC entity is associated with a first radio access network (RAN) and the secondary RLC entity is associated with a second RAN.

Embodiment 4: The method of any of Embodiments 1-3, wherein the UE is operating in a dual connectivity (DC) mode where the primary RLC entity is associated with a first cell and the secondary RLC entity is associated with a second cell.

Embodiment 5: The method of any of Embodiments 1-4, wherein the one or more conditions comprise an outstanding PDCP PDU volume falling below a threshold value in the middle of transmitting a transport block (TB); and the UE submits the PDCP PDU only to the secondary RLC entity.

Embodiment 6: The method of Embodiment 5, wherein one or more actions comprise submitting the PDCP PDUs to the secondary RLC entity until resources of a grant are exhausted.

Embodiment 7: The method of any of Embodiments 1-6, wherein the one or more conditions comprise an outstanding PDCP PDU volume falling below a threshold value in the middle of transmitting a transport block (TB); and the UE submits the PDCP PDU only to the secondary RLC entity.

Embodiment 8: The method of Embodiment 7, wherein the secondary RLC entity builds complete RLC PDUs without segmentation.

Embodiment 9: The method of Embodiment 7 or 8, wherein the secondary RLC entity is allowed to build RLC PDUs with segmentation.

Embodiment 10: The method of Embodiment 9, further comprising sending, on the primary RLC entity, the same PDCP PDUs that got segmented on the secondary RLC entity.

Embodiment 11: The method of any of Embodiments 1-10, wherein the one or more conditions comprise a block error rate (BLER) of at least one of the first or second RLC entities above a threshold value; and further comprising refraining from providing PDCP PDUs to the RLC entity with the BLER above the threshold value.

Embodiment 12: The method of Embodiment 11, further comprising refraining from reporting a non-zero buffer status report (BSR) for the RLC entity with the BLER above the threshold value.

Embodiment 13: The method of any of Embodiments 1-12, wherein the one or more conditions comprise a block error rate (BLER) of at least one of the first or second RLC entities above a threshold value; and further comprising retransmitting one or more PDCP PDUs, originally transmitted on the RLC entity with the BLER above the threshold value for which RLC acknowledgments have not been received, on the other RLC entity.

Embodiment 14: The method of any of Embodiments 1-13, wherein the primary RLC entity belongs to a master cell group (MCG) and the secondary RLC entity belongs to a secondary cell group (SCG).

Embodiment 15: The method of Embodiment 14, wherein the one or more conditions comprise a detection of a radio link failure (RLF) of one of a SCG RLC or an MCG RLC; and the method further comprises retransmitting the submitted PDCP PDU on the other of the SCG RLC or the MCG RLC.

Embodiment 16: The method of Embodiment 14, wherein the one or more conditions comprise a data volume being below a threshold; and the method further comprises submitting a new PDCP PDU on a MCG RLC even if data volume and primary configurations indicate that the new PDCP PDU should be submitted on a SCG RLC.

Embodiment 17: An apparatus for wireless communication by a user equipment (UE), comprising means for establishing a split bearer involving at least primary and secondary radio link control (RLC) entities; means for deciding, based on one or more conditions, whether to submit a Packet Data Convergence Protocol (PDCP) protocol data unit (PDU) to the primary RLC entity or the secondary RLC entity according to one or more rules; and means for submitting the PDCP PDU to at least one of the primary or secondary RLC entities in accordance with the decision.

Embodiment 18: The apparatus of Embodiment 17, wherein the one or more conditions are designed to avoid wastage of network provided resources.

Embodiment 19: The apparatus of Embodiment 17 or 18, wherein the UE is operating in a dual connectivity (DC) mode where the primary RLC entity is associated with a first radio access network (RAN) and the secondary RLC entity is associated with a second RAN.

Embodiment 20: The apparatus of any of Embodiments 17-19, wherein the UE is operating in a dual connectivity (DC) mode where the primary RLC entity is associated with a first cell and the secondary RLC entity is associated with a second cell.

Embodiment 21: The apparatus of any of Embodiments 17-20, wherein the one or more conditions comprise an outstanding PDCP PDU volume falling below a threshold value in the middle of transmitting a transport block (TB); and the one or more actions comprise submitting the PDCP PDU to the secondary RLC entity.

Embodiment 22: The apparatus of Embodiment 21, wherein the one or more actions comprise submitting the PDCP PDUs to the secondary RLC entity until resources of a grant are exhausted.

Embodiment 23: The apparatus of any of Embodiments 17-22, wherein the one or more conditions comprise an outstanding PDCP PDU volume falling below a threshold value in the middle of transmitting a transport block (TB); and the one or more actions comprise submitting the PDCP PDU to the secondary RLC entity.

Embodiment 24: The apparatus of Embodiment 23, wherein the secondary RLC entity builds complete RLC PDUs without segmentation.

Embodiment 25: The apparatus of Embodiment 23 or 24, wherein the secondary RLC entity is allowed to build RLC PDUs with segmentation.

Embodiment 26: The apparatus of Embodiment 25, further comprising means for sending, on the primary RLC entity, the same PDCP PDUs that got segmented on the secondary RLC entity.

Embodiment 27: The apparatus of any of Embodiments 17-26, wherein the one or more conditions comprise a block error rate (BLER) of at least one of the first or second RLC entities above a threshold value; and the one or more actions comprise refraining from providing PDCP PDUs to the RLC entity with the BLER above the threshold value.

Embodiment 28: The apparatus of Embodiment 27, further comprising means for refraining from reporting a non-zero buffer status report (BSR) for the RLC entity with the BLER above the threshold value.

Embodiment 29: The apparatus of any of Embodiments 17-28, wherein the one or more conditions comprise a block error rate (BLER) of at least one of the first or second RLC entities above a threshold value; and the one or more actions comprise retransmitting one or more PDCP PDUs, originally transmitted on the RLC entity with the BLER above the threshold value for which RLC acknowledgments have not been received, on the other RLC entity.

Embodiment 30: An apparatus for wireless communication by a user equipment (UE), comprising at least one processor and a memory configured to establish a split bearer involving at least primary and secondary radio link control (RLC) entities; decide, based on one or more conditions, whether to submit a Packet Data Convergence Protocol (PDCP) protocol data unit (PDU) to the primary RLC entity or the secondary RLC entity according to one or more rules; and submit the PDCP PDU to at least one of the primary or secondary RLC entities in accordance with the decision.

Embodiment 31: A computer readable medium having instructions stored thereon for establishing a split bearer involving at least primary and secondary radio link control (RLC) entities; deciding, based on one or more conditions, whether to submit a Packet Data Convergence Protocol (PDCP) protocol data unit (PDU) to the primary RLC entity or the secondary RLC entity according to one or more rules; and submitting the PDCP PDU to at least one of the primary or secondary RLC entities in accordance with the decision.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. A BS may support one or multiple (e.g., three) cells.

A network controller may couple to a set of BSs and provide coordination and control for these BSs. The network controller may communicate with the BSs via a backhaul. The BSs may also communicate with one another (e.g., directly or indirectly) via wireless or wireline backhaul.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 shown in FIG. 5 may be performed by one or more of the processors for UE 120 shown in FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
    establishing a split bearer involving at least primary and secondary radio link control (RLC) entities;
    deciding, based on one or more conditions, whether to submit a Packet Data Convergence Protocol (PDCP) protocol data unit (PDU) to the primary RLC entity or the secondary RLC entity according to one or more rules, wherein the one or more conditions comprise an outstanding PDCP PDU volume falling below a threshold value in the middle of transmitting a transport block (TB); and
    submitting the PDCP PDU to at least one of the primary or secondary RLC entities in accordance with the decision.

2. The method of claim 1, wherein the one or more conditions are designed to avoid wastage of network provided resources.

3. The method of claim 1, wherein the UE is operating in a dual connectivity (DC) mode where the primary RLC entity is associated with a first radio access network (RAN) and the secondary RLC entity is associated with a second RAN.

4. The method of claim 1, wherein the UE is operating in a dual connectivity (DC) mode where the primary RLC entity is associated with a first cell and the secondary RLC entity is associated with a second cell.

5. The method of claim 1, wherein
    deciding whether to submit a PDCP PDU to the primary RLC entity or the secondary RLC entity comprises deciding to submit the PDCP PDU to the secondary RLC entity.

6. The method of claim 5, wherein the UE submits the PDCP PDUs to the secondary RLC entity until resources of a grant are exhausted.

7. The method of claim 1, wherein
    deciding whether to submit a PDCP PDU to the primary RLC entity or the secondary RLC entity comprises deciding to submit the PDCP PDU only to the secondary RLC entity.

8. The method of claim 7, wherein the secondary RLC entity builds complete RLC PDUs without segmentation.

9. The method of claim 7, wherein the secondary RLC entity is allowed to build RLC PDUs with segmentation.

10. The method of claim 9, further comprising sending, on the primary RLC entity, the same PDCP PDUs that got segmented on the secondary RLC entity.

11. The method of claim 1, wherein:
the one or more conditions comprise a block error rate (BLER) of at least one of the first or second RLC entities above a threshold value; and further comprising refraining from providing PDCP PDUs to the RLC entity with the BLER above the threshold value.

12. The method of claim 11, further comprising refraining from reporting a non-zero buffer status report (BSR) for the RLC entity with the BLER above the threshold value.

13. The method of claim 1, wherein:
the one or more conditions comprise a block error rate (BLER) of at least one of the first or second RLC entities above a threshold value; and further comprising retransmitting one or more PDCP PDUs, originally transmitted on the RLC entity with the BLER above the threshold value for which RLC acknowledgments have not been received, on the other RLC entity.

14. The method of claim 1, wherein the primary RLC entity belongs to a master cell group (MCG) and the secondary RLC entity belongs to a secondary cell group (SCG).

15. The method of claim 14, wherein:
the one or more conditions comprise a detection of a radio link failure (RLF) of one of a SCG RLC or an MCG RLC; and
the method further comprises retransmitting the submitted PDCP PDU on the other of the SCG RLC or the MCG RLC.

16. The method of claim 14, wherein:
the one or more conditions comprise a data volume being below a threshold; and
the method further comprises submitting a new PDCP PDU on a MCG RLC even if data volume and primary configurations indicate that the new PDCP PDU should be submitted on a SCG RLC.

17. An apparatus for wireless communication by a user equipment (UE), comprising:
means for establishing a split bearer involving at least primary and secondary radio link control (RLC) entities;
means for deciding, based on one or more conditions, whether to submit a Packet Data Convergence Protocol (PDCP) protocol data unit (PDU) to the primary RLC entity or the secondary RLC entity according to one or more rules, wherein the one or more conditions comprise an outstanding PDCP PDU volume falling below a threshold value in the middle of transmitting a transport block (TB); and
means for submitting the PDCP PDU to at least one of the primary or secondary RLC entities in accordance with the decision.

18. The apparatus of claim 17, wherein the one or more conditions are designed to avoid wastage of network provided resources.

19. The apparatus of claim 17, wherein the UE is configured to operate in a dual connectivity (DC) mode where the primary RLC entity is associated with a first radio access network (RAN) and the secondary RLC entity is associated with a second RAN.

20. The apparatus of claim 17, wherein the UE is configured to operate in a dual connectivity (DC) mode where the primary RLC entity is associated with a first cell and the secondary RLC entity is associated with a second cell.

21. The apparatus of claim 17, wherein deciding whether to submit a PDCP PDU to the primary RLC entity or the secondary RLC entity comprises deciding to submit the PDCP PDU to the secondary RLC entity.

22. The apparatus of claim 21, wherein the UE is configured to submit the PDCP PDUs to the secondary RLC entity until resources of a grant are exhausted.

23. The apparatus of claim 21, wherein the secondary RLC entity is configured to build complete RLC PDUs without segmentation.

24. The apparatus of claim 21, wherein the secondary RLC entity is allowed to build RLC PDUs with segmentation.

25. The apparatus of claim 24, further comprising means for sending, on the primary RLC entity, the same PDCP PDUs that got segmented on the secondary RLC entity.

26. The apparatus of claim 17, wherein:
the one or more conditions comprise a block error rate (BLER) of at least one of the first or second RLC entities above a threshold value; and
the UE is configured to refrain from providing PDCP PDUs to the RLC entity with the BLER above the threshold value.

27. The apparatus of claim 26, further comprising means for refraining from reporting a non-zero buffer status report (BSR) for the RLC entity with the BLER above the threshold value.

28. The apparatus of claim 17, wherein:
the one or more conditions comprise a block error rate (BLER) of at least one of the first or second RLC entities above a threshold value; and
the UE is configured to retransmit one or more PDCP PDUs, originally transmitted on the RLC entity with the BLER above the threshold value for which RLC acknowledgments have not been received, on the other RLC entity.

29. An apparatus for wireless communication by a user equipment (UE), comprising:
at least one processor and a memory configured to
establish a split bearer involving at least primary and secondary radio link control (RLC) entities,
decide, based on one or more conditions, whether to submit a Packet Data Convergence Protocol (PDCP) protocol data unit (PDU) to the primary RLC entity or the secondary RLC entity according to one or more rules, wherein the one or more conditions comprise an outstanding PDCP PDU volume falling below a threshold value in the middle of transmitting a transport block (TB); and
submit the PDCP PDU to at least one of the primary or secondary RLC entities in accordance with the decision.

30. A non-transitory computer readable medium having instructions stored thereon for:
establishing a split bearer involving at least primary and secondary radio link control (RLC) entities;
deciding, based on one or more conditions, whether to submit a Packet Data Convergence Protocol (PDCP) protocol data unit (PDU) to the primary RLC entity or the secondary RLC entity according to one or more rules, wherein the one or more conditions comprise an outstanding PDCP PDU volume falling below a threshold value in the middle of transmitting a transport block (TB); and submitting the PDCP PDU to at least one of the primary or secondary RLC entities in accordance with the decision.

\* \* \* \* \*